United States Patent [19]
Keith

[11] 3,834,666
[45] Sept. 10, 1974

[54] CONTROL VALVE WITH ELASTICALLY LOADED CAGE TRIM

[75] Inventor: Gareth A. Keith, Needham, Mass.

[73] Assignee: Masoneilan International, Inc., Northwood, Mass.

[22] Filed: Oct. 2, 1972

[21] Appl. No.: 293,818

[52] U.S. Cl............ 251/361, 151/38, 285/187, 285/DIG. 18
[51] Int. Cl............................................ F16k 51/00
[58] Field of Search ....... 251/361, 362; 137/625.49, 137/625.5, 454.6, 454.5; 285/187, 340, DIG. 18, 332.3, 336; 85/61, 62, 1.5; 151/14 DW, 38

[56] References Cited
UNITED STATES PATENTS

| | | |
|---|---|---|
| 2,589,338 | 3/1952 | Candelise.................. 285/340 X |
| 2,980,132 | 4/1961 | Prijatel et al. ............... 137/454.5 X |
| 3,106,380 | 10/1963 | Gerber.................... 251/362 |
| 3,123,091 | 3/1964 | Elsey..................... 137/625.5 X |
| 3,186,430 | 6/1965 | Koutnik .................. 251/362 X |
| 3,228,655 | 1/1966 | Weise ................... 251/362 |
| 3,456,679 | 7/1969 | Graham .................. 251/367 X |
| 3,506,242 | 4/1970 | Aunspach ................ 251/361 |
| 3,527,249 | 9/1970 | Verheyden et al. ........... 285/187 X |
| 3,548,874 | 12/1970 | Parks .................... 137/625.5 |
| 3,625,552 | 12/1971 | Mahoff et al. .............. 285/340 X |

Primary Examiner—Henry T. Klinksiek

[57] ABSTRACT

Valve for fluid flow control, having cage type trim, and provided with means compressible between the cage trim and valve body whereby to resiliently pressure the cage against its seat. In a preferred embodiment, the elastically loaded or compressible means comprises a flat annular piece of resilient material.

1 Claim, 3 Drawing Figures

PATENTED SEP 10 1974　　3,834,666

CONTROL VALVE WITH ELASTICALLY LOADED CAGE TRIM

BACKGROUND OF THE INVENTION

With flow controlling valves such as the herein concerned cage type trim valves, differential expansion of the valve parts can occur when steam or other fluids at elevated temperature pass through the valve. One cause of such differential expansion is that the valve parts of relatively thin cross-section, such as the cage, will increase in temperature more quickly than will valve parts of thicker cross-section, such as the body. Another cause of the differential expansion is that the various valve parts, when made from materials having different coefficients of thermal expansion, will expand at different rates as the temperature of the valve changes.

The problem, then, is to allow for differential expansion of the valve parts, and particularly for differential expansion as between the valve cage and the valve body, thereby eliminating the need for the excessively heavy valve parts construction that would be required to withstand the high forces that would result were there no provision for such differential expansion.

SUMMARY OF THE INVENTION

Under this invention, the aforesaid problem is solved by elastically accommodating the differential expansion, and whereby the means clamping the valve bonnet to the body of the valve need have the strength to withstand only the hydrostatic forces, plus the spring force of the means introduced to elastically load the cage trim.

The invention resides more particularly in the solution of the described problem by the introduction of a new and improved form or type of differential-expansion-absorbing, cage-elastic-loading spring means.

In discovering and developing the solution to the problem, it has been found that various other types or forms of spring means, known in other, unrelated environments, do not meet the invention requirements. Thus a Belleville washer is found unsuitable because, among other reasons, it is more costly to produce, in requiring the special forming of it into a conical shape.

And a helical compression spring is found unsuitable as being less compact, or in other words, as requiring, for the same rate and load capacity, a too large installation space.

DESCRIPTION OF THE PREFERRED EMBODIMENT

Figure 1:
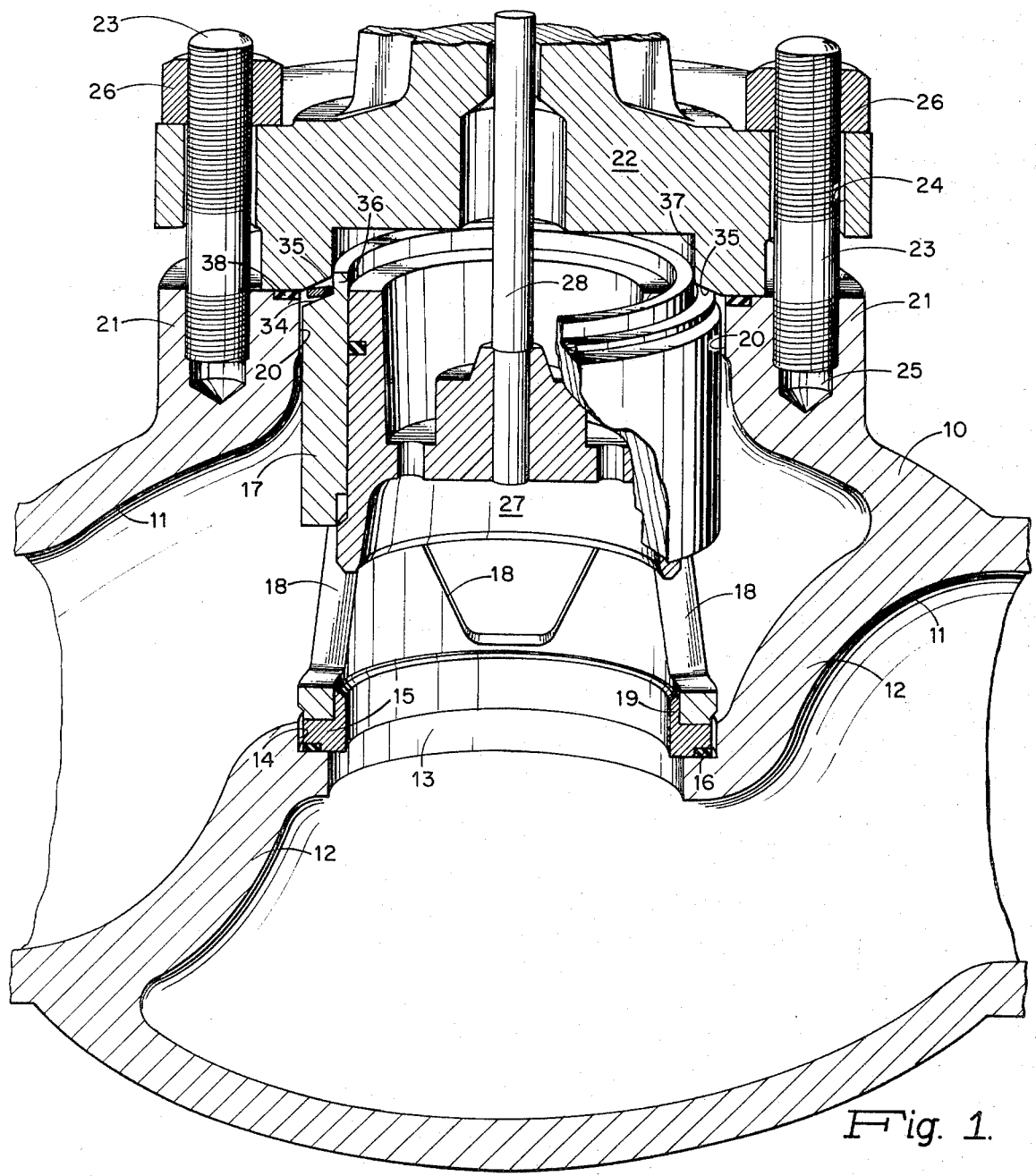
FIG. 1 is an isometric view of a cage-trim-fitted control valve of the invention, with the parts broken away to show their installed or spring-loaded condition and cross-section.

The invention has exemplary application to flow control valves provided with cage-type trim, such as the typical globe valve shown in the drawing to comprise a valve body 10 formed with a transverse, through-going, end-opening fluid passage 11.

Intermediate its ends, the valve body 10 is interiorly formed with a partition wall 12 dividing the passage 11, and formed centrally with an annular port opening 13 therethrough.

Partition wall 12 is annularly recessed at one side of opening 13 to define thereat a seat forming step or ledge 14.

Figure 3:
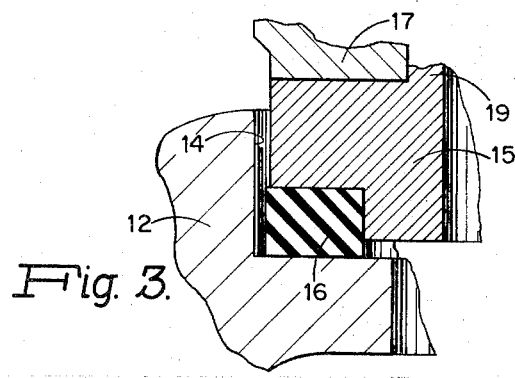
FIG. 3 is a larger scale view of the unstressed seat ring gasket, and associated parts.

Nested on ledge 14 is a usual seat ring 15, and side or bottom fitted or recessed sealing gasket 16, which gasket 16, as exaggeratedly shown in FIG. 3, extends initially, or in the uncompressed state, somewhat downwardly of the seat ring bottom surface.

The cage trim herein further comprises a cylinder 17 having the usual port openings 18, through which the fluid flows as it proceeds from left to right downwardly through, or from right to left upwardly from, partition port opening 13. The tubular or cylindrical cage 17 is centered on ring 15, herein by ring flange 19, extending upwardly of the seat ring body and mating outwardly to the inner wall of cage 17.

Valve body 10 is formed opposite partition wall 12 and partition port opening 13 with an access opening 20, herein as conventionally formed or defined by an annular rim or neck 21.

A usual bonnet 22 closes over access opening 20, and is releasably clamped to valve body 10 as by bolts 23 passed through over-sized openings 24 in the bonnet, turned into matingly threaded openings 25 in the neck 21, and receiving nuts 26, the turning down or up of which serves to clamp or release the bonnet 22 to or from the valve body 10 at the neck 21.

A valve plug 27 slides or telescopes within cage 17 and is fixed or supported on a stem 28, which is projected in known sealing manner through bonnet 22 for valve opening and closing control by an external actuator, not shown.

Under the invention, the cage 17 is deliberately made, wholly or in part, shorter than, or of lesser height than, the distance or spacing between the bonnet 22 and partition wall 12, or more particularly seat ring 15. The length or height of cage 17, relative to the spacing of the parts in endwise opposition to it, is calculated, in other words, always to leave a clearance or differential between the cage height and the seat ring - bonnet spacing, or between the cage and seat ring height and the partition ledge-bonnet spacing. The proportioning of the valve parts is calculated, again, to leave or provide this endwise clearance under all conditions of heating of the parts by steam or other elevated temperature fluids to which the valve may be subject, and notwithstanding the different rates of heating and the different thermal expansion coefficients by which the parts may be characterized, whether resulting from their different wall thicknesses, or from their differential materials, or otherwise.

In accordance with the invention, then, there is provided or mounted, in the spacing or gap between the differentially expansible parts, and herein between the cage 17 and bonnet 22, a spring operative to absorb the differential expansion of the parts, and thereby to eliminate the necessity for the substantial strengthening of the valve and valve clamping parts that would be required if there were no such provision for their differential expansion. The differential expansion to be absorbed by the spring more particularly is that which is generated or produced under all conditions, or over the full range, of differential heating and differential heating rate to be encountered in the operation of the valve. In the invention application, the differential-expansion-absorbing spring is additionally required, of course, and continuously under all said differential expansion conditions, to elastically or axially load the cage 17 and seat ring 15 with adequate force to cause gasket 16 to compress from its unstressed extension below ring 15, as exaggeratedly shown in FIG. 3, so as always to seal effectively between the seat ring 15 and the valve body or, more particularly, the partition ledge 14. As thus expressed, the operation of the spring means, again and more particularly, is to maintain said seat ring seal, irrespective of the occurrence of, and hence over the full range of cage-valve body gap closing or opening by, expansion or contraction of cage 17, relative to, or differentially from, expansion or contraction of valve body 10.

Numerous problems surround the providing of a cage 17 loading spring as just described.

For one thing, a very high load capacity is required. Thus, in valve sizes from 6 to 16 inches, maximum loads ranging from, say, 24,000 pounds to, say, 50,000 pounds must be designed for.

Another requirement is that of limited space. Thus, acceptable spring means thickness as, in the valve sizes mentioned, may fall in practice, and for example, in a range of from about 0.376 to about 0.535 inches.

A third requirement is that of small deflection. Again, in the 6 to 16-inch valve sizes herein considered by way of illustration the operative maximum deflections are measured in a range of about 0.058 inches to about 0.183 inches, for example. It will be readily apparent that, as one amongst the known types of compression spring means, the conventional helical spring will not meet the foregoing requirements.

A fourth requirement is that materials supplying the necessary combination of high load capacity and flexibility, as needed to seal the seat gasket 16 while accommodating the differential thermal expansion as between the cage 17 and body 10 over the wide range of temperature conditions here concerned, must be materials supplying also high strength, or which come within the classification or category of high strength materials.

Under this invention, it has been determined still further that to achieve the spring strength herein required within the limitations of thickness and deformation that are herein additionally required, the spring means must not only have been fabricated of the high strength category of materials, but also must have been cold formed, merely, for retention of the proper metal grain orientation, or that grain orientation which is requisite to achieving the required spring strength.

For the foregoing reasons, then, Belleville washer, as another known type of spring means, have been found altogether unsuited to the invention purposes. For one thing, Belleville washers are not commerically available, in the high strength materials and specific sizes herein required. More importantly, the Belleville washers are not cold formed to their final shape, but rather are machined into their Belleville washer shape, whereby the required grain orientation is destroyed in the finished piece, i.e., in the Belleville washer.

Accordingly, under this invention there is novelly provided, for the cage trip elastic loading or spring means, a flat disc spring. The flat disc spring hereof, it will be understood, can be and is machined from cold worked material without destroying grain orientation, and hence without loss of grain orientation reflecting spring strength. Still further, the flat disc spring hereof is fabricated of a material, of a dimension, and with spring characteristics, whereby it meets the hereinbefore mentioned requirements of minute space, small deflection and high load capacity.

Hereinbefore mentioned are spring thicknesses meeting the practical, and satisfying also the invention requirements, in the specified valve sizes. It will be additionally understood from the foregoing description that the diametral dimensions of the spring are, in the preferred embodiment as shown, limited to the diametral dimensions of the cylindrical cage which the spring is holding in place.

Figure 2:
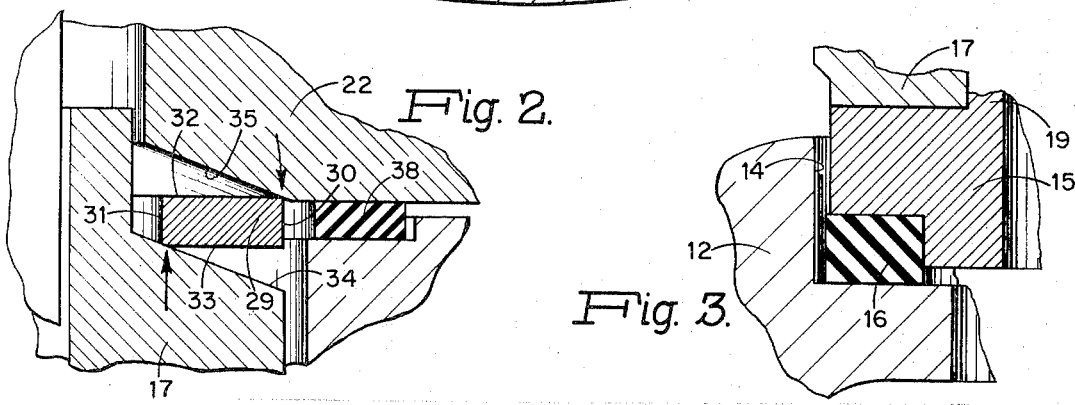
FIG. 2 is a larger scale view of the invention spring and associated parts in unloaded condition.

Under the invention, then, there is preferred for the spring means a flat annular piece or ring 29 of resilient material, and more particularly spring metal material, for example, stainless steel, and which, when in the unloaded condition, FIG. 2, has a rectangular cross-section.

Exemplary stainless steel materials found to supply the high strength herein required are those identified commercially as 17-4PH stainless steel, and as Inconel X750.

The flat spring 29 is formed more particularly with an outer face or diameter 30 which is constant and concentric with the parallel inside face or diameter 31; and it is formed intermediate the same with two, flat, opposed or upper and lower faces 32, 33 which also are parallel with each other. Spring 29, thus, is square cornered when unloaded and defines a parallelogram when stressed, or deflected, FIG. 1.

For cooperating or loading engagement with the spring 29, the cage 17 and bonnet 22 are provided with opposed, axial thrust bearing surfaces 34, 35 which are formed more particularly as mating or generally parallel surfaces that are conically shaped, as shown. These mating conical surfaces, being on large, easily machined parts, are simple and economical to produce.

As most clearly shown in FIG. 2, the flat spring 29 engages conical, axial thrust bearing surface 35 of bonnet 22 at one side, or more particularly, at the intersection of its outer and upper faces or surfaces 30, 32; and it engages conical, axial thrust bearing surface 34 of cage 17 at its other side, or more particularly, at the intersection of its inner and lower faces or surfaces 31, 33.

The flat spring 29 seats on the upper end of the cage 17 outside an inner cage flange 36, extending upwardly the cage inner wall into a central, annular, downfacing recess 37 formed in the bonnet 22. Outside said recess 37, the bonnet 22 is sealed to the valve body neck 21 by the usual gasket 38, such as recessed in one or the other of those parts, herein the neck 21, at the opposing faces thereof.

The unloaded flat spring 29 initially assembles to the cage 17 and bonnet 22 as shown in FIG. 2. When the bonnet 22 is clamped to the valve body 10, or more particularly its neck 21, by the turning down of the nuts 26 on bolts 23, the spring 29 is deflected or twisted out of flat, in the manner indicated by the arrows, FIG. 2, to the non-rectangular-section or conical or parallelogram form of FIG. 1, thereby elastically loading the cage 17 and seat ring 15.

As hereinbefore pointed out, the purpose of elastically loading the cage is first to allow differential expansion between the cage 17 and the valve body 10 without requiring excessively heavy valve parts to withstand the high forces that would result if the parts were, as conventionally, rigidly clamped in endwise relation. And the differential expansion of the valve parts has been indicated to occur when steam or other fluid at elevated temperature passes through the valve, causing parts of relatively thin cross-section such as the cage 17 to increase the temperature more quickly than valve parts of thicker section, as the body 10. The differential expansion additionally results from valve temperature changes, up or down, whenever the materials selected for the interrelated parts, such as, again, the cage 17 and the body 10, are materials having different coefficients of thermal expansion.

In operation, the flat spring 29 must axially load cage 17 and seat ring 15 with adequate force to cause the gasket 16 to seal between the seat ring 15 and the valve body 10, or more particuarly, the partition wall ledge 14. This seal-establishing is emphasized in the drawings as the deformation or compression of gasket 16 from its depending, unstressed form exaggeratedly shown in FIG. 3 to its compacted or flush sealing condition or form shown in the operative or FIG. 1 illustration.

The further requirement of flat spring 29 of the invention, it will be understood, is to maintain the seal just described whenever cage expansion or contraction occurs. That is, once the valve assembly is clamped up, the elastic load, tension, or return-to-flat force of spring 29 must be such as to maintain the sealing load on ring 15 and gasket 16, as hereinabove described, throughout the range of variation in spacing of the cage 17 and bonnet 22, or the variation in spacing more particularly of their respective axial thrust bearing surfaces 34, 35, as results, again, from the differential expansion as described of those valve parts. Such differential expansion resulting, as also hereinbefore mentioned, either from the passing of elevated temperature fluids through, or merely from variation in the temperature of, the valve.

The clamping up of the bolts 23, to set up the load on spring 29 by the closing together of the conical faces 34, 35 so as to allow or cause said spring 29 to deflect, FIG. 2, will be understood to require bolts 23 only of a size to withstand the hydrostatic forces that may be developed within the valve passage 11, in combination with the spring or deflection resisting force or torque of the initially flat spring 29, as that force acts on the cage 17 and oppositely on bonnet 22.

I claim:

1. In a control valve, in combination,
   a valve body;
   means forming a fluid passage through said body;
   an intermediate partition interiorly dividing said passage;
   a port opening through said partition;
   compressible sealing means engaged at said partition and around said port opening;
   an access opening through the wall of said body opposite said port opening;
   a bonnet closing over said access opening;
   means manipulable for adjustably clamping said bonnet to said body;
   tubular valve means received through said access opening, engaged to said partition, and overlying said compressible sealing means, said tubular valve means extending from said partition axially of said port opening to a determined small spacing below said bonnet;
   opposed, annular, closely spaced, axial-thrust-bearing surfaces on said bonnet and valve means; and
   spring means engaged between said bonnet and valve means surfaces, said spring means constructed and arranged to be axially loaded over the range of variation of the spacing of said surfaces resulting from different rates of heating of, and from different coefficients of thermal expansion of, said valve body and tubular valve means;
   said thrust bearing surfaces being parallel, inclined surfaces;
   said spring means being a metal ring of flat, rectangular section, said ring supported on one of said parallel, inclined surfaces at one side of its inner periphery and supported on the other of said parallel, inclined surfaces at the other side of its outer periphery, whereby said ring is twisted out of flat to dished form by the manipulating of said means for clamping said bonnet;
   said metal ring having a small thickness of from about 0.376 inches to about 0.535 inches; and
   said metal ring being constructed of a stainless steel alloy which has high strength and elasticity properties, which has been cold worked to retain said properties over long-term use subject to high and repeated twistloading, and which, in said thicknesses and in valve sizes of from about 6 inches to about 16 inches, has a small deflection of from about 0.058 inches to about 0.183 inches, and withstands maximum loads ranging from about 24,000 pounds to about 50,000 pounds.

* * * * *